United States Patent
Zhao et al.

(10) Patent No.: US 12,169,024 B2
(45) Date of Patent: Dec. 17, 2024

(54) CARTRIDGE TYPE MECHANICAL SEALING DEVICE FOR SEALING LIQUID

(71) Applicant: AIGI Environmental Inc., Nanjing (CN)

(72) Inventors: Jingwei Zhao, Nanjing (CN); Jun Zhang, Nanjing (CN)

(73) Assignee: AIGI Environmental Inc, Nanjing (CN)

( * ) Notice: Subject to any disclaimer, the term of this patent is extended or adjusted under 35 U.S.C. 154(b) by 260 days.

(21) Appl. No.: 17/888,851

(22) Filed: Aug. 16, 2022

(65) Prior Publication Data
US 2023/0055493 A1  Feb. 23, 2023

(30) Foreign Application Priority Data

Aug. 18, 2021 (CN) .......................... 202110947063.8

(51) Int. Cl.
*F16J 15/34* (2006.01)
(52) U.S. Cl.
CPC ......... *F16J 15/3464* (2013.01); *F16J 15/348* (2013.01); *F16J 15/3488* (2013.01)
(58) Field of Classification Search
CPC ...... F16J 15/34; F16J 15/3452; F16J 15/3464; F16J 15/348; F16J 15/3488; F16J 15/38
See application file for complete search history.

(56) References Cited

U.S. PATENT DOCUMENTS

| | | | | |
|---|---|---|---|---|
| 2,297,302 A | * | 9/1942 | Hornschuch | F16J 15/38 277/348 |
| 3,675,933 A | * | 7/1972 | Nappe | F04D 29/126 285/16 |
| 4,434,986 A | * | 3/1984 | Warner | F16J 15/3464 277/374 |
| 5,490,679 A | * | 2/1996 | Borrino | F16J 15/3472 277/369 |

(Continued)

*Primary Examiner* — Nicholas L Foster
(74) *Attorney, Agent, or Firm* — Grogan, Tuccillo & Vanderleeden, LLP

(57) ABSTRACT

The present application discloses a cartridge type mechanical sealing device for sealing liquid, the sealing device including a gland, a rotating ring adaptor assembly, a rotating ring, a stationary ring adaptor, a stationary ring, and a locking ring mounted around a rotating shaft. The gland is configured to be fastened to a rear end surface of the equipment enclosure; the rotating ring adaptor assembly including a front end portion configured to be in the liquid and supporting the rotating ring and a rear end portion extending through the gland to be surrounded by the locking assembly which is configured to fasten the rotating ring adaptor assembly to the rotating shaft; the stationary ring adaptor is fastened to a rear end surface of the gland; and when the stationary ring adaptor is released from the gland, a rotating ring adaptor of the rotating ring adaptor assembly or the stationary ring adaptor can be pulled along the rotating ring in a direction away from the liquid so as to be separated from the gland, thereby separating the rotating ring and the stationary ring to release the sealing interface and exposing the rotating ring and the stationary ring to the outside air (Continued)

respectively and providing for in-line maintenance and a reduction of possible leakage points.

16 Claims, 13 Drawing Sheets

(56) References Cited

U.S. PATENT DOCUMENTS

| | | | | |
|---|---|---|---|---|
| 6,076,830 A * | 6/2000 | Wu | ............... | F16J 15/3488 277/408 |
| 6,120,034 A * | 9/2000 | Kowalski | ............ | F16J 15/3488 277/377 |
| 6,155,572 A * | 12/2000 | Wu | ............... | F16J 15/3488 277/306 |
| 6,386,547 B2 * | 5/2002 | Wu | ............... | F16J 15/3488 277/408 |
| 6,561,515 B1 * | 5/2003 | Bjornson | ............ | F16J 15/3488 277/306 |
| 6,814,355 B2 * | 11/2004 | Bjornson | ............ | F16J 15/3488 277/374 |
| 6,935,632 B2 * | 8/2005 | Azibert | ............... | F16J 15/3464 277/371 |
| 8,215,644 B2 * | 7/2012 | Huang | ............... | F16J 15/3404 277/361 |
| 8,251,372 B2 * | 8/2012 | Wood | ............... | F16J 15/16 277/543 |
| 11,268,617 B2 * | 3/2022 | Zhao | ............... | F16J 15/3472 |
| 11,603,935 B2 * | 3/2023 | Zhao | ............... | F16J 15/3472 |
| 2001/0010416 A1 * | 8/2001 | Wu | ............... | F16J 15/3488 277/408 |
| 2003/0189292 A1 * | 10/2003 | Bjornson | ............ | F16J 15/3488 277/370 |
| 2004/0169336 A1 * | 9/2004 | Azibert | ............... | F16J 15/3464 277/370 |
| 2004/0201176 A1 * | 10/2004 | Bjornson | ............ | F16J 15/3488 277/370 |
| 2005/0242516 A1 * | 11/2005 | Azibert | ............... | F16J 15/3464 277/370 |
| 2007/0056154 A1 * | 3/2007 | Bjornson | ............ | F16J 15/3488 29/432 |
| 2010/0038861 A1 * | 2/2010 | Huang | ............... | F16J 15/3484 277/372 |
| 2018/0238452 A1 * | 8/2018 | Shaw | ............... | F16J 15/164 |
| 2019/0383396 A1 * | 12/2019 | Zhao | ............... | F16J 15/3492 |
| 2020/0300368 A1 * | 9/2020 | Shaw | ............... | F16J 15/164 |
| 2022/0112956 A1 * | 4/2022 | Zhao | ............... | F16J 15/3492 |

* cited by examiner

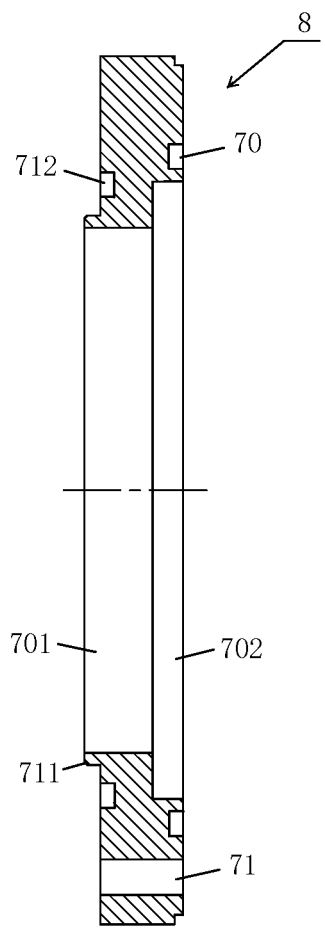
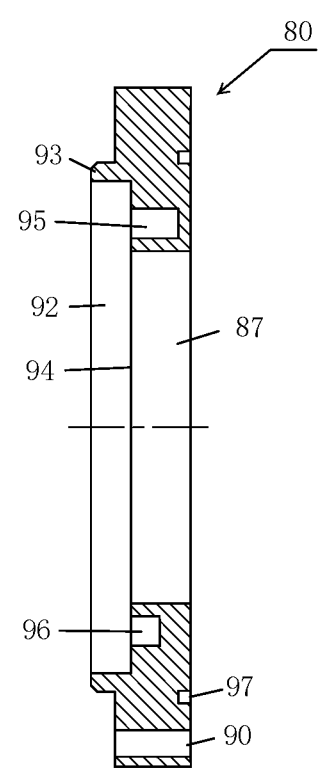
Fig. 20
Fig. 21

CARTRIDGE TYPE MECHANICAL SEALING DEVICE FOR SEALING LIQUID

CROSS-REFERENCE TO RELATED APPLICATION

This application claims priority to Chinese Application No. 202110947063.8 filed on Aug. 18, 2021, all of which is hereby incorporated by reference in its entirety.

TECHNICAL FIELD

The present application relates to liquid sealing technology, and in particular to a cartridge type mechanical sealing device for sealing liquid, the sealing device being disposed between a rotating shaft and an equipment enclosure and having rotating and stationary ring adaptors that can be pulled axially backwards.

BACKGROUND

There are various kinds of cartridge type mechanical sealing devices for sealing liquid in the prior art, all of which have rotating and stationary rings located in a liquid within rotating equipment, and then an outer gland is utilized to seal an equipment enclosure of the rotating equipment so as to avoid the liquid from leaking and splashing.

A cartridge type mechanical sealing device for sealing liquid can have a round or square shape as viewed from an end thereof. As the rotating and stationary rings and springs axially pressing the rotating ring against the stationary ring are all located in the liquid and shielded by the gland, it can't be checked and inspected in-line how the rotating and stationary rings and the springs are operated. Moreover, if the entire sealing device or an internal component of it is to be replaced or repaired, it is required to shut down and disassemble the rotating equipment.

Then, it is known there is a split-type mechanical sealing device which is easy to assemble. The split-type mechanical sealing device comprises a gland, rotating and stationary ring adaptors, rotating and stationary rings, and elastic bodies, all of which can be split in a radial direction such that when replacing and repairing the split-type mechanical sealing device, it may not need to disassemble the rotating equipment, such as a pump. However, as the split-type mechanical sealing device possesses excessive split points resulting in excessive possible leakage points, its strength is degraded and can't withstand a high working pressure.

SUMMARY

An object of the present application is to provide a cartridge type mechanical sealing device for sealing liquid with improved overall performance.

For this, the present application provides a cartridge type mechanical sealing device for sealing liquid, the sealing device being configured to seal a rotating shaft extending through an equipment enclosure so as to seal a liquid existed inside the equipment enclosure from outside air, and comprising a gland, a rotating ring adaptor assembly, a rotating ring, a stationary ring adaptor, a stationary ring, and a locking ring mounted around the rotating shaft, wherein each of the gland, the rotating ring adaptor assembly, and the stationary ring adaptor is an integral part; the gland is configured to be fastened to a rear end surface of the equipment enclosure; the rotating ring adaptor assembly comprises a front end portion configured to be in the liquid and supporting the rotating ring via a first elastic sealing O-ring and a rear end portion extending through the gland to be away from the liquid and surrounded by the locking assembly which is configured to fasten the rotating ring adaptor assembly to the rotating shaft; the stationary ring adaptor is fastened to a rear end surface of the gland and comprises an inner peripheral surface configured to be adjacent to the liquid and supporting the stationary ring via a second elastic sealing O-ring; an end surface of the rotating ring adjoins an end surface of the stationary ring by means of springs so as to form a sealing interface perpendicular to an axis of the rotating shaft; and when the stationary ring adaptor is released from the gland, a rotating ring adaptor of the rotating ring adaptor assembly or the stationary ring adaptor can be pulled along the rotating ring in a direction away from the liquid so as to be separated from the gland, thereby separating the rotating ring and the stationary ring to release the sealing interface and exposing the rotating ring and the stationary ring to the outside air respectively.

Optionally, one or both of the rotating ring and the stationary ring are configured to be of split type which can be split along a split line that is perpendicular to the axis of the rotating shaft.

Optionally, one or both of the first elastic sealing O-ring and the second elastic sealing O-rings are configured to be of split type.

Optionally, the sealing device further comprises a spring adaptor mounted around the rear end portion of the rotating ring adaptor assembly, fastened to the stationary ring adaptor, and comprising a front end portion provided with spring slots for receiving the springs respectively, wherein when the spring adaptor is released from the stationary ring adaptor, the spring adaptor can be pulled along the rotating ring in the direction away from the liquid so as to be separated from the stationary ring adaptor, thereby exposing the springs to the outside air.

Optionally, the rotating ring adaptor assembly comprises a shaft sleeve surrounding the rotating shaft and comprising a front end portion provided with spring slots for receiving the springs, and wherein the rotating ring adaptor is mounted around the shaft sleeve and comprises a front end portion pushed by the springs and a rear end portion supporting the rotating ring.

Optionally, the gland is provided with a rinsing bore extending radially therethrough, while the stationary ring adaptor comprises an outer periphery formed with an annular groove configured to be in communication with an radially inner end of the rinsing bore and comprising an radially inner end in communication with a front end surface of the stationary ring adaptor via a plurality of axial orifices; or wherein the stationary ring adaptor comprises an outer periphery formed with a rinsing bore extending radially inwards and comprising an radially inner end in communication with a front end surface of the stationary ring adaptor via an orifice.

Optionally, the stationary ring is configured to be moved forwards relative to the stationary ring adaptor so as to be separated from the stationary ring adaptor; or the stationary ring is configured to be moved backwards relative to the stationary ring adaptor so as to be separated from the stationary ring adaptor.

Optionally, the sealing device further comprises detachable positioning blocks, the locking ring is rotatably positioned relative to the positioning blocks so as to package the gland, the rotating ring adaptor assembly, the rotating ring supported by the rotating ring adaptor assembly via the first elastic sealing O-ring, the stationary ring adaptor, the stationary ring supported by the stationary ring adaptor via the second elastic sealing O-ring, and the springs, thereby forming a cartridge mechanical seal.

Optionally, the springs are configured as cylindrical coil-springs.

Optionally, the stationary ring adaptor is fastened to the rear end surface of the gland by inserting a main body of the stationary ring adaptor into the gland or attaching the main body of the stationary ring adaptor to the rear end surface of the gland, and wherein the spring adaptor is fastened to a rear end surface of stationary ring adaptor by inserting a main body of the spring adaptor into the stationary ring adaptor or attaching the main body of the spring adaptor to the rear end surface of the stationary ring adaptor.

When extending partially through the gland to an outside (airside), both of the rotating ring adaptor assembly and the stationary ring adaptor can be pulled axially backwards along with the rotating and stationary rings so as to check the exposed rotating and stationary rings and replace the worn rotating and/or stationary rings to avoid a sealing failure.

On the one hand, as one or both of the rotating and stationary rings and/or one or both of the first and second elastic sealing O-rings can be split in the radial direction for easy disassembly and replacement, the sealing device provided in the present application or an internal component of it can be maintained in-line, thereby reducing a downtime loss and the maintenance cost. On the other hand, as each of the gland, the rotating ring adaptor assembly, and the stationary ring adaptor is configured to be the integral part rather than a split-type part, the sealing device provided in the present application possesses reduced possible leakage points and hence its strength is enhanced, thereby effectively preventing accidents caused by sealing failures and meeting operating requirements.

In addition, as the integral spring adaptor disposed with respect to the stationary ring can be pulled axially backwards, the springs axially pressing the rotating ring against the stationary ring can be exposed for inspection or replacement, thereby avoiding a sealing failure caused by the worn and degraded springs.

BRIEF DESCRIPTION OF THE DRAWINGS

FIG. 20 is a cross-sectional view of a gland of the sealing device of FIG. 15;

FIG. 21 is a cross-sectional view of a spring adaptor of the sealing device of FIG. 15.

DETAILED DESCRIPTION

Figure 1:
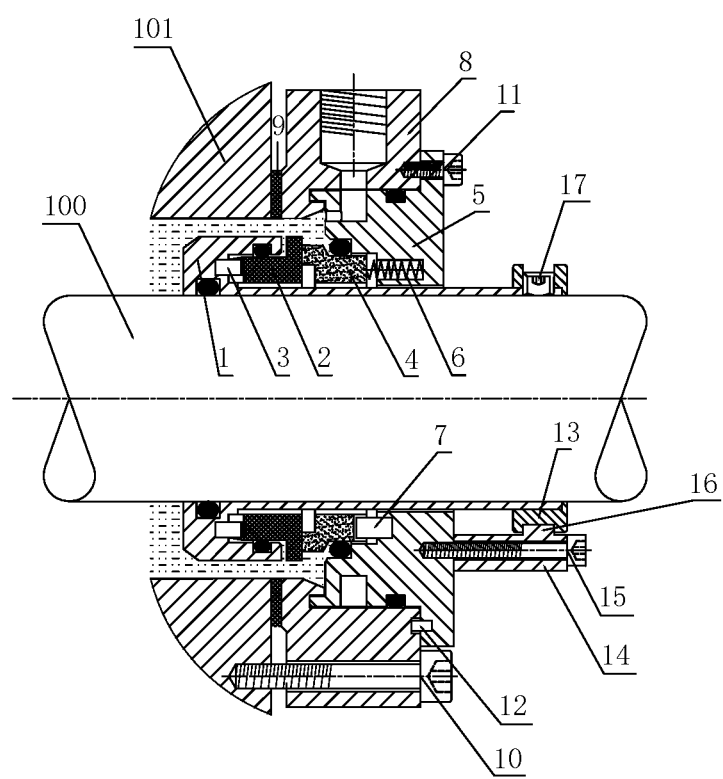
FIG. 1 is a cross-sectional view of a cartridge type mechanical sealing device for sealing liquid according to an embodiment of the present application.

Various exemplary embodiments of the present application will now be described in detail with reference to the drawings. It should be noted that the relative arrangement of the components and steps, the numerical expressions, and numerical values set forth in these embodiments do not limit the scope of the present application unless it is specifically stated otherwise.

Techniques, methods and apparatus as known by one of ordinary skill in the relevant art may not be discussed in detail but are intended to be part of the specification where appropriate.

The following description of one or more exemplary embodiments is merely illustrative in nature and is in no way intended to limit the present application or its uses. Therefore, other exemplary embodiments may have different values, structures, or features.

It should be noted that the same reference numerals and letters refer to the same items in the figures, and thus once an item is defined in one figure, it may not be further discussed for the subsequent figures.

The present application generally relates to a cartridge type mechanical sealing device for sealing liquid, an embodiment of which is illustrated in FIGS. 1 and 2, and FIGS. 3 to 10 illustrate some more details of the embodiment. The embodiment will be described below with reference to these figures.

Figure 2:
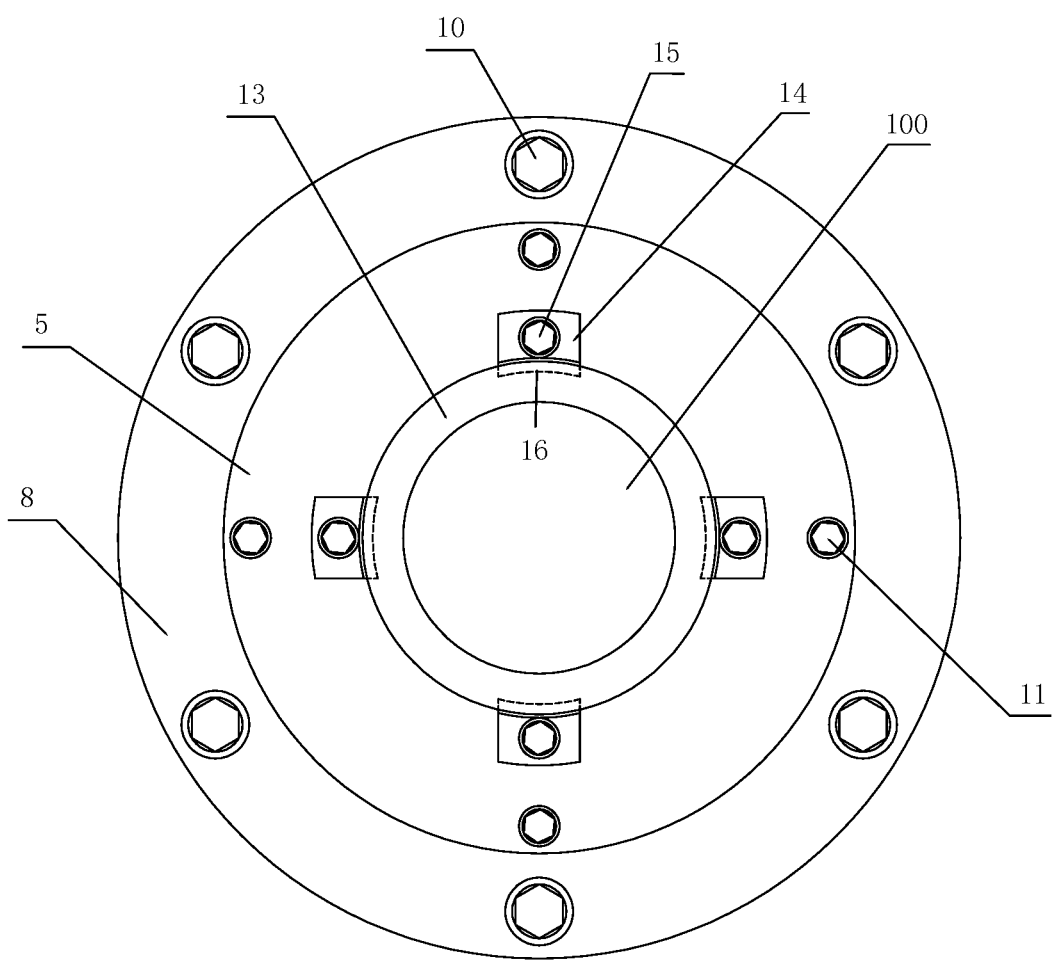
FIG. 2 is an end view of the sealing device of FIG. 1.

As illustrated in FIGS. 1 and 2, the sealing device is used to seal a rotating shaft 100 with respect to an equipment enclosure 101. The equipment enclosure 101 defines a front side filled with a liquid (as shown on the left in FIG. 1) and a rear side filled with air (as shown on the right in FIG. 1). The rotating shaft 100 extends through the equipment enclosure 101 from the front side to the rear side.

The sealing device mainly comprises a rotating ring module fixed to and rotating with the rotating shaft 100 and a stationary ring module fixed to the equipment enclosure 101 but not rotating with the rotating shaft 100.

The rotating ring module comprises a rotating ring adaptor assembly 1 and a rotating ring 2 supported by the rotating ring adaptor assembly 1. The rotating ring 2 is rotationally fixed to the rotating ring adaptor assembly 1 by means of a plurality of pins 3.

The stationary ring module comprises a gland 8, a stationary ring adaptor 5, and a stationary ring 4 supported by the stationary ring adaptor 5. The stationary ring adaptor 5 is provided with a number of springs 6 to press the stationary ring 4 axially forwards, and the stationary ring 4 is rotationally fixed to the stationary ring adaptor 5 by means of a plurality of pins 7. As the stationary ring 4 is pushed axially forwards by means of the springs 6, the stationary ring 4 then presses against the rotating ring 2 with a certain axial force exerted by the springs 6 and is rotatable relative to the rotating ring 2. As such, an end surface of the rotating ring 2 adjoins an end surface of the stationary ring 4 by means of the springs 6 so as to form a sealing interface perpendicular to an axis of the rotating shaft 100. Preferably, the springs 6 are configured as small cylindrical coilsprings.

One or both of the rotating and stationary rings 2, 4 can be of split type which can be split along a split line, that is, each comprise a pair of semi-annular halves which can constitute a completed sealing ring while being mounted around the rotating shaft 100 opposingly to each other. Each half of the pair of halves can be provided with a matching part, such as a convex or concave matching part, at its engaged or split surface, so as to maintain an engaged state between the pair of halves when they are engaged with each other. Further, the engaged surfaces of the pair of halves can be rough to facilitate maintaining the engaged state.

Still further, the split line between the pair of halves is perpendicular to the axis of the rotating shaft 100.

If both of the rotating and stationary rings 2,4 are of split type, the split line of the rotating ring 2 would be offset from the split line of the stationary ring 4 circumferentially.

Preferably, in the present application, both of the rotating and stationary rings 2,4 are of split type for easy inspection or replacement. However, it is also within the scope of the present application that only one of the rotating and stationary rings 2,4 (especially the one that is prone to wear) can be of split type.

The gland 8 is configured to fix the stationary ring module relative to the equipment enclosure 101. There is provided a sealing gasket 9 between the gland 8 and the equipment enclosure 101. The gland 8 is fastened to a rear wall surface of the equipment enclosure 101 by a number of bolts 10.

The stationary ring adaptor 5 is fastened to a rear end surface of the gland 8 by a number of bolts 11. Moreover, the stationary ring adaptor 5 is rotationally fixed to the gland 8 by means of a number of pins 12.

The rotating ring adaptor assembly 1 is mounted around the rotating shaft 100, and there is provided a locking ring 13 surrounding an axial rear end portion of the rotating ring adaptor assembly 1 to fix the rotating ring adaptor assembly 1 to the rotating shaft 100. Specifically, one or more fastening screws 17 are screwed into the locking ring 13 in a radial direction and extend through the axial rear end portion of the rotating ring adaptor assembly 1 so as to fasten the rotating ring adaptor assembly 1 to the rotating shaft 100.

The locking ring 13 is fixed axially relative to the stationary ring adaptor 5 by a number of positioning blocks 14. Each bolt 15 extending through the corresponding positioning block 14 in an axial direction fixes the positioning block 14 to an axial rear end surface of the stationary ring adaptor 5. Each positioning block 14 has a radial protrusion 16 inserted into an annular guiding groove of the locking ring 13 such that the locking ring 13, on the one hand, is restricted from moving axially relative to the stationary ring adaptor 5 and, on the other hand, is allowed to rotate relative to the stationary ring adaptor 5. The positioning blocks 14 are detachable such that the positioning blocks 14 can be detached from the stationary ring adaptor 5 before the rotating shaft 100 is to be rotated in a normal operation.

The number and distribution of the bolts 10, 11, 15, the positioning blocks 14 and the radial protrusions 16 can be referred to but not limited to those as shown in FIG. 2.

Figure 3:
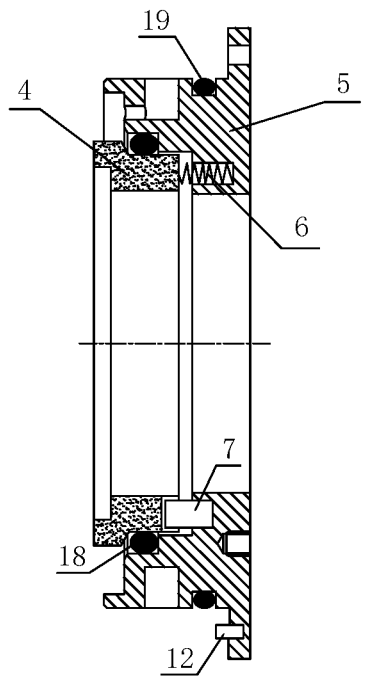
FIG. 3 is a cross-sectional view of a stationary ring module of the sealing device of FIG. 1.

FIG. 3 shows the stationary ring 4 is sealed relative to the stationary ring adaptor 5 by an elastic sealing O-ring 18 arranged between the stationary ring 4 and the stationary ring adaptor 5. In addition, the stationary ring adaptor 5 is provided with an O-ring 19 on its outer periphery so as to seal the stationary ring adaptor 5 relative to the gland 8.

Figure 4:
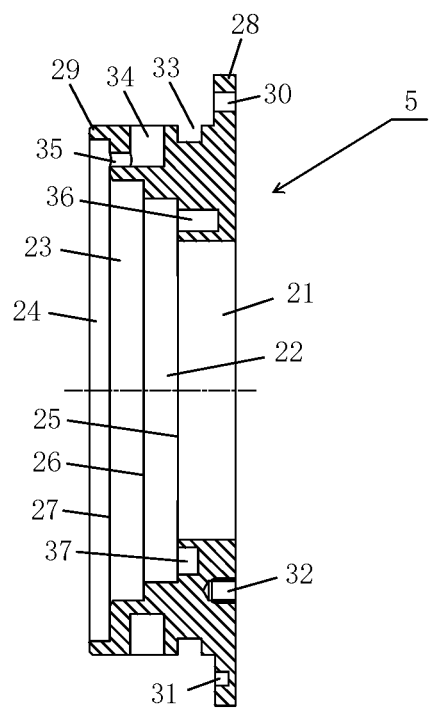
FIG. 4 is a cross-sectional view of a stationary ring adaptor of the stationary ring module of FIG. 3.

Referring to FIG. 4, the stationary ring adaptor 5 is an integral part in a substantially toroidal shape, comprising in its axial interior in a direction from there are side to the front side a groove 21, a disc-shaped groove 22 with a diameter greater than that of the groove 21, a disc-shaped groove 23 with a diameter greater than that of the groove 22, and a disc-shaped groove 24 with a diameter greater than that of the groove 23. As such, an annular stepped surface 25 facing the front side is defined between the grooves 21, 22, an annular stepped surface 26 facing the front side is defined between the grooves 22, 23, and an annular stepped surface 27 facing the front side is defined between the grooves 23, 24. The diameter of the groove 21 is slightly greater than the outer diameter of a shaft sleeve 51 of the rotating ring adaptor assembly 1.

The stationary ring adaptor 5 has a rear end portion forming a flange 28 protruding radially outwards relative to a main body of the stationary ring adaptor 5 and a front end portion forming a convex ring portion 29 protruding axially forwards. In addition, the convex ring portion 29 has an inner periphery defining the groove 24.

The flange 28 is mounted axially resting against the rear end surface of the gland 8. The flange 28 is formed with axial through-ports 30 through which the bolts 11 can be inserted respectively. In addition, the flange 28 has a front end surface formed with pin apertures 31 for receiving the pins 12 respectively.

The rear end surface of the stationary ring adaptor 5 is formed with a number of threaded apertures 32 into which the bolts 15 are screwed respectively.

Further, the main body of the stationary ring adaptor 5 has an outer periphery formed with an annular groove 33, positioned adjacent to and in front of the flange 28, for placing the O-ring 19.

Still further, another annular groove 34 is formed at the outer periphery of the main body of the stationary ring adaptor 5 in front of the annular groove 33 and has a radially inner end communicated to the groove 24 through a plurality of axial orifices 35.

Still further, a number of spring slots 36 for accommodating rear end portions of the springs 6 respectively and a number of pin apertures 37 into which rear parts of the pins 7 are inserted respectively extend axially backwards from the stepped surface 25.

Figure 5:
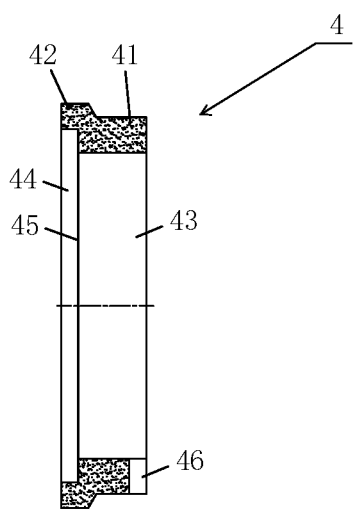
FIG. 5 is a cross-sectional view of a stationary ring of the stationary ring module of FIG. 3.

Referring to FIG. 5, the stationary ring 4 can have a toroidal shape and preferably comprise two halves that can be engaged. For example, the stationary ring 4 comprises a cylindrical body 41 and a convex ring portion 42 with an outer diameter greater than that of the cylindrical body 41 in front of the cylindrical body 41. In addition, the stationary ring 4 has an axial hole 43 and a groove 44 with a diameter greater than that of the axial hole 43. The diameter of the axial hole 43 is slightly greater than the outer diameter of the shaft sleeve 51.

The cylindrical body 41 has a rear end surface formed with a number of pin slots 46 for accommodating front parts of the pins 7 respectively. The pin slots 46 can radially extend through the cylindrical body 41.

When mounting the stationary ring 4 to the stationary ring adaptor 5, a rear part of the cylindrical body 41 is inserted backwards into the groove 22 of the stationary ring adaptor 5 and the rear end surface of the cylindrical body 41 is pressed forwards by the springs 6 to keep a short distance from the stepped surface 25. A front part of the cylindrical body 41 carries the O-ring 18 in the groove 23. The convex ring portion 42 is substantially located within the groove 24. Optionally, a front end of the convex ring portion 42 can slightly protrude forward beyond a front end of the convex ring portion 29.

Figure 6:
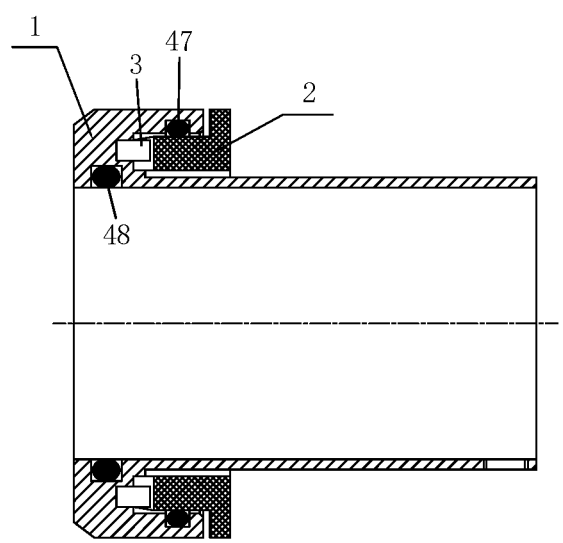
FIG. 6 is a cross-sectional view of a rotating ring module of the sealing device of FIG. 1.

FIG. 6 shows the rotating ring adaptor assembly 1 is sealed relative to the rotating ring 2 by an elastic sealing O-ring 47 arranged between the rotating ring adaptor assembly 1 and the rotating ring 2. The rotating ring adaptor assembly 1 is sealed relative to the rotating shaft 100 by an O-ring 48.

Optionally, one or both of the elastic sealing O-rings 47, 18 are configured to be of split type which can be split into two halves respectively, and each of the two halves of the elastic sealing O-rings 47, 18 is provided with a matching part, including but not limited to a convex or concave matching part, an embedded part, and an incision part, so as to maintain an engaged state between the two halves when they are engaged with each other.

Figure 7:
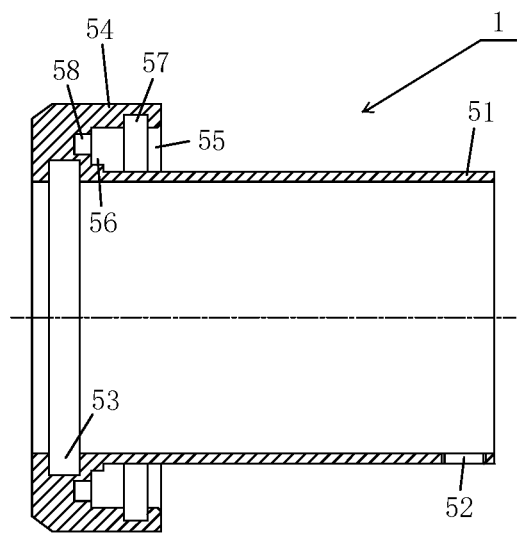
FIG. 7 is a cross-sectional view of a rotating ring adaptor assembly of the rotating ring module of FIG. 6.

Referring to FIG. 7, the rotating ring adaptor assembly 1 is an integral part in a substantially cylindrical shape, comprising the shaft sleeve 51 with an inner diameter substantially equal to the outer diameter of the rotating shaft 100 so as to be mounted around the rotating shaft 100. The shaft sleeve 51 has a rear end portion formed with a number of radial openings 52 through which the fastening screws 17 can be screwed respectively. In addition, the shaft sleeve 51 has a front end portion with an inner periphery formed with an annular groove 53 for placing the O-ring 48.

The rotating ring adaptor assembly 1 further comprises a flanging 54 bent backwards from a front end portion of the shaft sleeve 51 and surrounding the front end portion of the shaft sleeve 51 such that an annular groove 55 is defined between an inner peripheral wall of the flanging 54 and an outer peripheral wall of the front end portion of the shaft sleeve 51. The outer peripheral wall of the front end portion of the shaft sleeve 51 has an enlarged diameter in front of the annular groove 55 so as to form a narrowed annular groove 56. In addition, an annular groove 57 is formed in the inner peripheral wall of the flanging 54 for placing the O-ring 47. In addition, a plurality of pin slots 58 in which the pins 3 are inserted respectively extend axially forwards from the annular groove 56.

Figure 8:
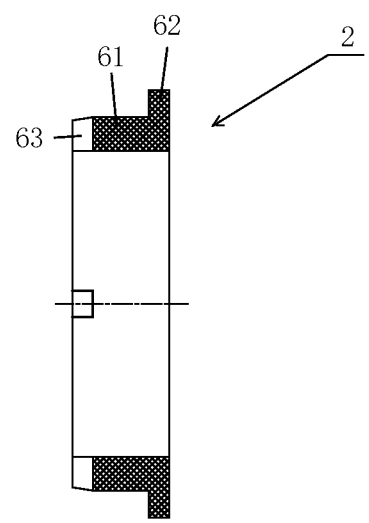
FIG. 8 is a cross-sectional view of a rotating ring of the rotating ring module of FIG. 6.

Referring to FIG. 8, the rotating ring 2 has a toroidal shape defining an axial through-hole with a diameter slightly greater than the outer diameter of the shaft sleeve 51. Preferably, the rotating ring 2 comprises two halves that can be engaged. For example, the rotating ring 2 comprises a cylindrical body 61 and a flange 62 protruding radially outwards at a rear end portion of the cylindrical body 61. The flange 62 has an outer diameter substantially equal to the outer diameter of the flanging 54 of the rotating ring adaptor assembly 1. The front end portion of the cylindrical body 61 comprises a truncated cone portion formed with a number of pin slots 63 for accommodating rear parts of the pins 3 respectively. Preferably, the pin slots 63 can penetrate through the truncated cone portion radially.

When mounting the rotating ring 2 to the rotating ring adaptor assembly 1, the rotating ring 2 to be mounted around the shaft sleeve 51 can slide forwards from the rear end portion of the shaft sleeve 51 until the cylindrical body 61 is inserted into the annular groove 55 of the rotating ring adaptor assembly 1and the truncated cone portion is inserted into the narrowed annular groove 56. The flange 62 can be configured to be faced to and slightly spaced apart from a rear end surface of the flanging 54.

After the rotating ring 2 is mounted to the rotating ring adaptor assembly 1, the stationary ring 4 and the stationary ring adaptor 5 can slide forwards from the rear end portion of the shaft sleeve 51, until a front end surface of the stationary ring 4 contacts with a rear end surface of the rotating ring 2. The convex ring portion 42 of the stationary ring 4 is pressed forwards against the rear end surface of the rotating ring 2 with the axial force exerted by the springs 6, wherein the convex ring portion 42 has an outer annular section pressing against the flange 62 and an inner annular section pressing against the cylindrical body 61.

As such, the rotating and stationary rings 2,4 and the stationary ring adaptor 5 are mounted around the shaft sleeve 51 of the rotating ring adaptor assembly 1 in order. The shaft sleeve 51 extends sufficiently in a lengthwise direction to carry the rotating and stationary rings 2,4 and the stationary ring adaptor 5 and expose the rear end portion of the shaft sleeve 51 from the stationary ring adaptor 5 to insert the rear end portion of the shaft sleeve 51 into the locking ring 13.

Figure 9:
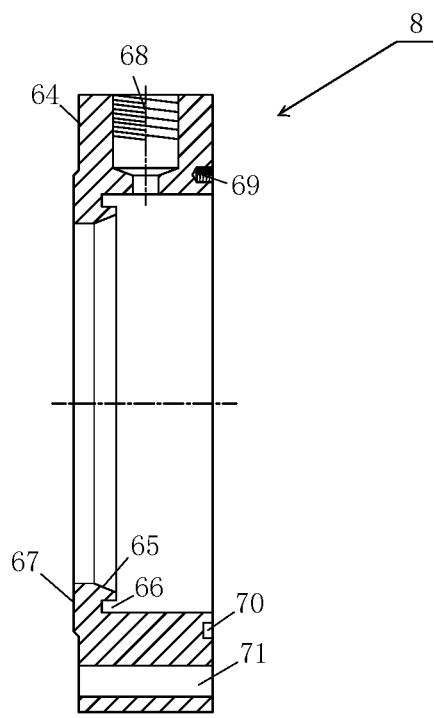
FIG. 9 is a cross-sectional view of a gland of the sealing device of FIG. 1.

Referring to FIG. 9, the gland 8 is an integral part in a substantially toroidal shape comprising a ring body 64 defining an axial through-hole and an annular hook portion 65 extending backwards from a front end of an inner peripheral wall of the ring body 64. An annular groove 66 is defined between the annular hook portion 65 and the inner peripheral wall of the ring body 64. The annular hook portion 65 has a front end slightly protruding forwards relative to a front end surface of the ring body 64 to form an annular boss 67. The annular body 64 is formed with a radial rinsing bore 68 having a radially outer section which is threaded such that a screw plug can be screwed into the radially outer section to close the rinsing bore 68. In addition, the ring body 64 has a rear end surface formed with a number of threaded apertures 69 into which the bolts 11 can be screwed respectively and a number of pin apertures 70 for accommodating front parts of the pins 12 respectively. In addition, the ring body 64 is formed with a number of axial through-ports 71 through which the bolts 10 can be inserted respectively.

The annular boss 67 of the gland 8 is fastened to the rear wall surface of the equipment enclosure 101 while abutting against the sealing gasket 9. The main body of the stationary ring adaptor 5 is inserted forward into the axial through-hole of the gland 8 until the convex ring portion 29 is inserted into the annular groove 66. The rinsing bore 68 has a radially inner section aligned with the groove 34 so as to communicate with the groove 34. The O-ring 19 seals the main body of the stationary ring adaptor 5 and the ring body 64 of the gland 8. The flange 28 is fastened to the rear end surface of the gland 8 by the bolts 11.

An inner periphery defined by the hook portion 65 of the gland 8 has a diameter greater than the outer diameters of the flange 62 of the rotating ring 2 and the flanging 54 of the rotating ring adaptor assembly 1 such that a gap is formed between the inner periphery of the gland 8 and outer peripheries of the rotating ring adaptor assembly 1 and the rotating and stationary rings 2,4. The rinsing bore 68 is communicated to the inside of the equipment enclosure 101 through a rinsing passage formed by the groove 34, the axial orifices 35, and a part of the groove 24 of the stationary ring adaptor Sand the gap.

Figure 10:
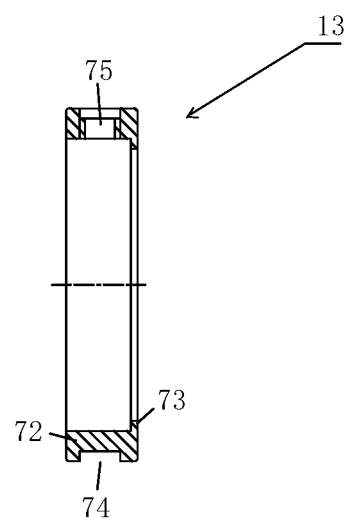
FIG. 10 is a cross-sectional view of a locking ring of the sealing device of FIG. 1.

Referring to FIG. 10, the locking ring 13 is an integral part in a substantially toroidal shape defining an axial through-hole. The locking ring 13 comprises a cylindrical body 72 and an annular ring 73 protruding radially inwards from a rear end portion of the cylindrical body

72. The axial through-hole comprises a main section defined by the cylindrical body 72 and a narrowed section defined by the annular ring 73. The main section has an inner diameter equal to or slightly greater than the outer diameter of the rear end portion of the shaft sleeve 51 of the rotating ring adaptor assembly 1, and the narrowed section has an inner diameter slightly greater than the outer diameter of the rotating shaft 100. When mounting the locking ring 13 around the rotating shaft 100, the cylindrical body 72 is configured to surround the rear end portion of the shaft sleeve 51, and the annular ring 73 is axially pushed forward against a rear end surface of the shaft sleeve 51.

The cylindrical body 72 has an outer peripheral surface formed with an annular guiding groove

74. The positioning blocks 14 are evenly distributed around the rear end portion of the shaft sleeve 51 and the locking ring 13, while the radial protrusion 16 of each positioning block 14 is slidably inserted into the annular guiding groove 74, thereby allowing the locking ring 13 to rotate relative to the positioning blocks 14 but stopping the locking ring 13 from being axially moved relative to the positioning blocks 14.

In addition, the cylindrical body 72 is formed with one or more threaded apertures 75 which can radially extend from the annular guiding groove 74 through an inner peripheral wall of the cylindrical body 72. Each fastening screw 17 can be screwed through the corresponding threaded aperture 75 and a corresponding opening 52 in the rear end portion of the shaft sleeve 51 to fasten the shaft sleeve 51 onto an outer peripheral wall of the rotating shaft 100.

As such, in the sealing device provided in the present application, the locking ring 13 is rotatably positioned relative to the positioning block 14 so as to package the gland 8, the rotating ring adaptor assembly 1, the rotating ring 2 supported by the rotating ring adaptor assembly 1 via the elastic sealing O-ring 47, the stationary ring adaptor 5, the stationary ring 4 supported by the stationary ring adaptor 5 via the elastic sealing O-ring 18, and the springs, thereby forming a cartridge (package) type mechanical seal. Subsequently, the rotating ring module is fixed to the rotating shaft 100 by the fastening screws 17 so as to rotate with the rotating shaft 100, the stationary ring module is fixed to the equipment enclosure 101 and hence cannot rotate with the rotating shaft 100, the stationary ring 4 is axially pressed forward against the rotating ring 2 by means of the springs 6 while allowing the rotating ring 2 to rotate relative to the stationary ring 4, and the locking ring 13 can rotate with the rotating shaft 100 relative to the stationary ring adaptor 5 but cannot move axially.

Compared with a sealing device in which each of a gland, rotating and stationary ring adaptors, rotating and stationary rings, and elastic bodies is of split type, the sealing device provided in the present application, in which one or both of the rotating and stationary rings 2, 4 and/or one or both of the elastic sealing O-rings 47, 18 can be of split type while the rotating ring adaptor assembly 1, the stationary ring adaptor 5, and the gland 8 each are an integral part, has reduced possible leakage points and hence its strength is enhanced, thereby effectively preventing accidents caused by sealing failures and meeting operating requirements.

More particularly, the rotating and stationary rings 2, 4 and the stationary ring adaptor 5 are all carried by the rotating ring adaptor assembly 1, and then the rotating ring adaptor assembly 1 and the stationary ring adaptor 5 are connected by the locking ring 13, so when mounting the sealing device to the rotating shaft 100, the rotating and stationary ring modules can act as a package to slide forward along the rotating shaft 100 and inserted into the equipment enclosure 101, and then the gland 8 is fastened to the equipment enclosure 101. Each of the rotating ring adaptor assembly 1, the rotating and stationary rings 2, 4, and the stationary ring adaptor 5 at least partially contacts with the liquid inside the equipment enclosure 101, while each of the rotating ring adaptor assembly 1 and the stationary ring adaptor 5 is at least partially exposed to an airside. The rear end portion of the rotating ring adaptor assembly 1 is fastened to the rotating shaft 100, and the rear end portion of the stationary ring adaptor 5 is fastened to the gland 8. The rotating ring adaptor assembly 1 is restricted from moving axially relative to the stationary ring adaptor 5 but is allowed to rotate relative to the stationary ring adaptor 5. As described above, when the mounting of the sealing device is completed, the positioning blocks 14 are removed, so the rotating shaft 100 can rotate in the normal operation.

When maintaining the sealing device (the positioning blocks 14 are removed) provided by the present application, the bolts 11 can be unscrewed to release the stationary ring adaptor 5 from the gland 8 such that the stationary ring adaptor 5 supporting the stationary ring 4 can slide backwards along the rotation shaft 100 to separate from the gland 8, thereby separating the rotating and stationary rings 2, 4 to release or eliminate the sealing interface and exposing the rotating and stationary rings 2, 4 to the airside. As such, the rotating and stationary rings 2, 4 and the spring 6 can be checked and replaced if necessary. For example, if the rotating and/or stationary rings 2, 4 can be of split type, two old halves of the rotating and/or stationary rings 2, 4 can be removed in the radial direction, and then two new halves of the rotating and/or stationary rings 2, 4 can be mounted around the rotating shaft 100 opposingly to each other. In addition, the locking ring 13 and the stationary ring adaptor 5 can be spaced apart from each other in such a distance that the stationary ring adaptor 5 can slide backwards along the rotating shaft 100 sufficiently. Correspondingly, each of the shaft sleeve 51 and the positioning blocks 14 is elongated.

As in the sealing device provided by the present application, the gland 8, the rotating ring adaptor assembly 1 and the stationary ring adaptor 5 are all integral parts, the cartridge type mechanical seal is realized with the minimum number of split-type parts, resulting in the reduced possible leakage points, the enhanced strength, and the effective in-line maintenance of the sealing device. In the meanwhile, sealing rings (i.e., the rotating and stationary rings) are of split type so as to be easy and quick to be replaced for emergency and widely used. As such, a downtime loss and a cost caused by the maintenance of the sealing device are reduced while the safety, effectiveness and reliability of the sealing device operation are ensured.

According to the principles of the present application, those skilled in the art can make various modifications to the sealing device as described above.

Figure 11:
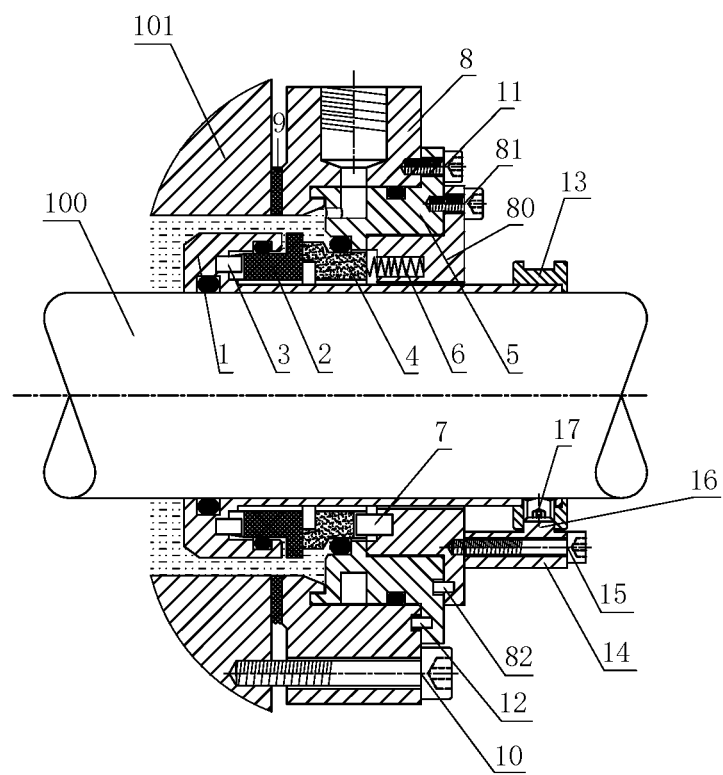
FIG. 11 is a cross-sectional view of a cartridge type mechanical sealing device for sealing liquid according to another embodiment of the present application.
Figure 12:
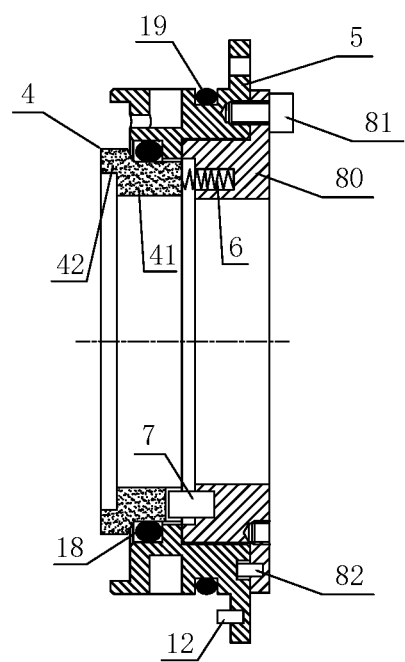
FIG. 12 is a cross-sectional view of a stationary ring module of the sealing device of FIG. 11.
Figure 13:
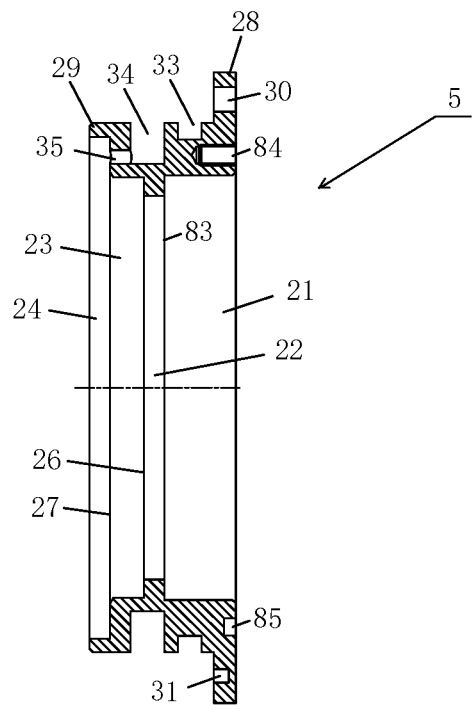
FIG. 13 is a cross-sectional view of a stationary ring adaptor of the stationary ring module of FIG. 12.
Figure 14:
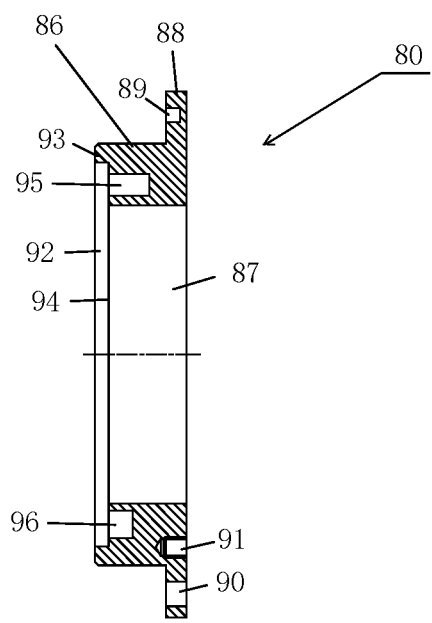
FIG. 14 is a cross-sectional view of a spring adaptor of the stationary ring module of FIG. 12.

For example, FIG. 11 shows another exemplary embodiment of a cartridge type mechanical sealing device for sealing liquid and FIGS. 12-14 show some structural details of it. The embodiment as illustrated in FIGS. 11-14 specifies a stationary ring module somewhat different from the embodiment as illustrated in FIGS. 1-10.

As illustrated in FIGS. 11 and 12, the stationary ring module comprises a stationary ring 4 which can be the same as the stationary ring in the embodiment as illustrated in FIGS. 1-10, a stationary ring adaptor 5 and a spring adaptor 80. The stationary ring 4 has a cylindrical body 41 inserted backwards into and supported by the stationary ring adaptor 5. The spring adaptor 80 has a front end portion inserted forward into and supported by the stationary ring adaptor 5 and a rear end portion fixed to a rear end surface of the stationary ring adaptor 5 by means of a number of bolts 81 and rotationally fixed to the stationary ring adaptor 5 by means of one or more pins 82. Detachable positioning blocks 14 are fastened to a rear end surface of the spring adaptor 80 by bolts 15.

In addition, the spring adaptor 80 has a front end surface facing a rear end surface of the stationary ring 4 (i.e., a rear end surface of the cylindrical body 41), and a number of springs bare provided to press against the rear end surface of the stationary ring 4. In addition, a number of pins 7 are disposed between the front end surface of the spring adaptor 80 and the rear end surface of the stationary ring 4 such that the spring adaptor 80 can rotationally fixed to the stationary ring 4.

Referring to FIG. 13, the stationary ring adaptor 5 is an integral part in a substantially toroidal shape, comprising in its axial interior in a direction from arear side to a front side a groove 21, a disc-shaped groove 22 with a diameter smaller than that of the groove 21, a disc-shaped groove 23 with a diameter greater than that of the groove 22, and a disc-shaped groove 24 with a diameter greater than that of the groove 23. As such, an annular stepped surface 83 facing the rear side is defined between the grooves 21, 22, an annular stepped surface 26 facing the front side is defined between the grooves 22, 23, and an annular stepped surface 27 facing the front side is defined between the grooves 23, 24. The diameter of the groove 22 is slightly greater than the outer diameter of the cylindrical body 41.

The stationary ring adaptor 5 has a rear end portion forming a flange 28 protruding radially outwards relative to a main body of the stationary ring adaptor 5 and a front end portion forming a convex ring portion 29 protruding axially forwards. In addition, the convex ring portion 29 has an inner periphery defining the groove 24.

In addition, a rear end surface of the stationary ring adaptor 5 is formed with a plurality of threaded apertures 84 into which the bolts 81 can be screwed respectively and one or more pin slots 85 for placing front parts of the pins 82 respectively.

The flange 28 is mounted axially resting against a rear end surface of a gland 8. The flange 28 is formed with axial through-ports 30 through which bolts 11 can be inserted respectively. In addition, the flange 28 has a front end surface formed with pin apertures 31 for receiving pins 12 respectively.

Further, the main body of the stationary ring adaptor 5 has an outer periphery formed with an annular groove 33, positioned adjacent to and in front of the flange 28, for placing an O-ring 19.

Still further, an annular groove 34 is formed at the outer periphery of the main body of the stationary ring adaptor 5 in front of the annular groove 33, and the groove 34 has a radially inner end communicated to the groove 24 through a plurality of axial orifices 35.

Referring to FIG. 14, the spring adaptor 80 is an integral part in a substantially toroidal shape, comprising a cylindrical body 86 defining an axial hole 87 and a flange 88 extending radially outwards from a rear end portion of the cylindrical body 86. The cylindrical body 86 has an outer diameter approximately equal to or slightly smaller than the inner diameter of the groove 21 of the stationary ring adaptor 5. In addition, the cylindrical body 86 (not including the flange 88) has an axial length approximately equal to the axial length of the groove 21 such that the cylindrical body 86 can be inserted into the groove 21 until the flange 88 is rested against the rear end surface of the stationary ring adaptor 5.

The flange 88 has a front end surface formed with one or more pin slots 89 in which rear parts of the pins 82 can be inserted respectively. In addition, the flange 88 is formed with a plurality of axial ports 90 through which the bolts 81 can be inserted. In addition, the rear end surface of the spring adaptor 80 is formed with a number of threaded apertures 91 into which the bolts 15 can be screwed respectively.

The axial hole 87 has a front end portion forming an enlarged section 92 with an enlarged diameter. Due to the enlarged section 92, a convex ring portion 93 protruding axially forwards and a stepped surface 94 facing the front side are formed at a front end portion of the cylindrical body 86. The convex ring portion 93 is configured to be rested against the stepped surface 83 of the stationary ring adaptor 5. A number of spring slots 95 extend axially backwards from the stepped surface 94 so as to accommodate rear parts of the springs 6 respectively, and a number of pin apertures 96 into which rear parts of the pins 7 can be inserted extend axially backwards from the stepped surface 94.

The rotating and stationary rings 2, 4, the stationary ring adaptor 5, and the spring adaptor 80 are mounted around a shaft sleeve 51 of a rotating ring adaptor assembly 1 in order. As such, the shaft sleeve 51 extends sufficiently in a lengthwise direction to carry the rotating and stationary rings 2, 4, the stationary ring adaptor 5, and the spring adaptor 80 and expose a rear end portion of the shaft sleeve 51 from the stationary ring adaptor 5 and insert the rear end portion of the shaft sleeve 51 into a locking ring 13. The rotating ring adaptor assembly 1 is fastened to a rotating shaft 100 by means of fastening screws 17. The locking ring 13 and the spring adaptor 80 are locked in the axial direction by means of the detachable positioning blocks 14 and the bolts 15. The locking ring 13 can rotate relative to the positioning blocks 14 but cannot move axially.

Other parts of the embodiment as illustrated in FIGS. 1-10 can be the same as or similar to the embodiment as illustrated in FIGS. 1-10 and will not be described here.

More particularly, the bolts 11 can be unscrewed to move the stationary ring adaptor 5 backwards along the rotating shaft 100. In addition, as the spring adaptor 80 supports the springs 6 pushing the stationary ring 4 forwards, the bolts 81 can be unscrewed separately to release and separate the spring adaptor 80 from the stationary ring adaptor 5 so as to expose the springs 6 to an airside. As such, the springs 6 can be checked and replaced conveniently. In addition, the locking ring 13 and spring adaptor 80 can be spaced apart from each other in such a distance that the stationary ring adaptor 5 and/or the spring adaptor 80 can slide backwards along the rotating shaft 100 sufficiently. Correspondingly, each of the shaft sleeve 51 and the positioning blocks 14 is elongated.

Figure 15:
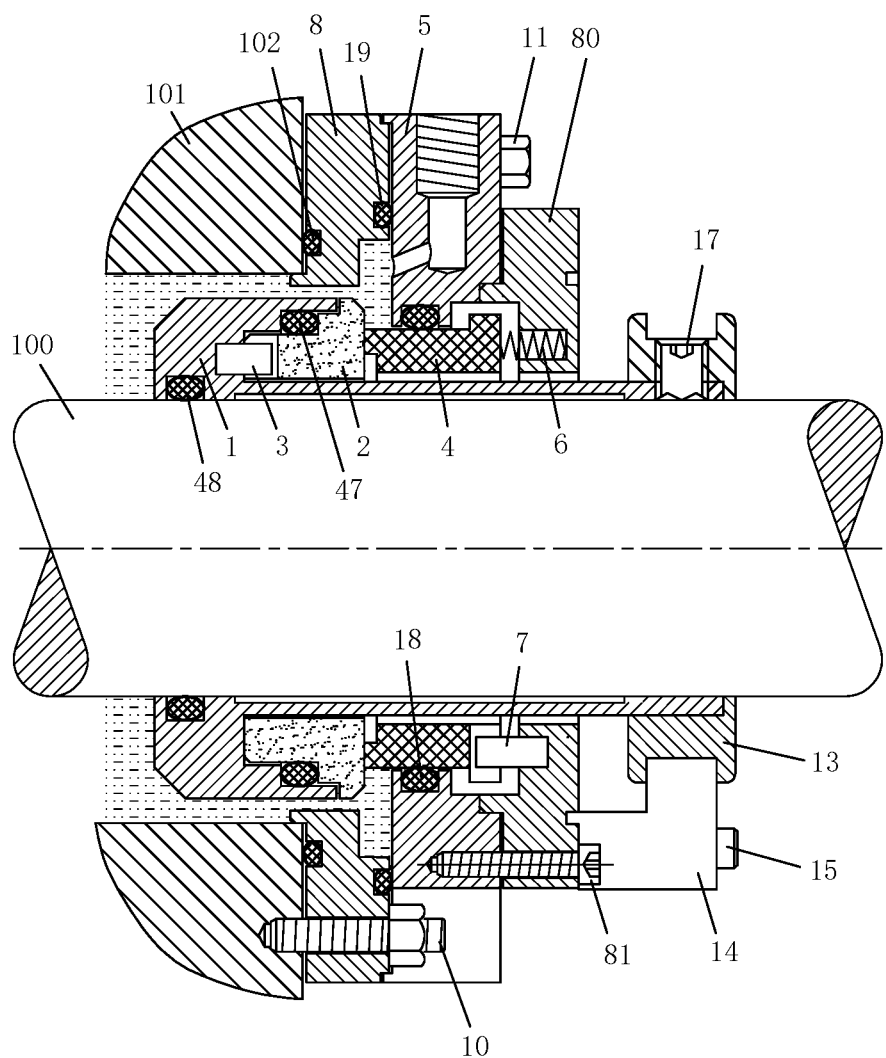
FIG. 15 is a cross-sectional view of a cartridge type mechanical sealing device for sealing liquid according to yet another embodiment of the present application.

FIG. 15 shows yet another exemplary embodiment of a cartridge type mechanical sealing device for sealing liquid and FIGS. 16-21 show some structural details of it. The embodiment illustrated in FIGS. 15-21 adopts a spring adaptor and other parts somewhat different from the embodiment illustrated in FIGS. 11-14.

Referring to FIG. 15, the sealing device mainly comprises a rotating ring module fixed to and rotating with a rotating shaft 100 and a stationary ring module fixed to an equipment enclosure 101 but not rotating with the rotating shaft 100.

The rotating ring module comprises a rotating ring adaptor assembly 1 mounted around the rotating shaft 100 and a rotating ring 2 supported by the rotating ring adaptor assembly 1. An O-ring 47 is disposed between the rotating ring adaptor assembly 1 and the rotating ring 2, and the rotating ring 2 is rotationally fixed to the rotating ring adaptor assembly 1 by means of a number of pins 3. The rotating ring adaptor assembly 1 has a front end portion sealed relative to the rotating shaft 100 via an O-ring 48.

The stationary ring module comprises a stationary ring 4, a stationary ring adaptor 5 and a spring adaptor 80. The stationary ring adaptor 5 is configured to surround and support the stationary ring 4. An O-ring 18 is disposed between an inner periphery of the stationary ring adaptor 5 and an outer periphery of the stationary ring 4. A spring adaptor 80 is fixed to a rear end surface of the stationary ring adaptor 5 by a number of bolts 81.

The spring adaptor 80 has a front end surface facing a rear end surface of the stationary ring 4 and pressed against there are end surface of the stationary ring 4 by means of a number of springs 6. In addition, a number of pins 1 is disposed between the front end surface of the spring adaptor 80 and the rear end surface of the stationary ring 4 such that the spring adaptor

80 is rotationally fixed to the stationary ring 4. As the stationary ring 4 is pushed axially forwards by means of the springs 6, the stationary ring 4 then presses against the rotating ring 2 with a certain axial force and is rotatable relative to the rotating ring 2.

A gland 8 is provided to fix the stationary ring module relative to the equipment enclosure 101. The gland 8 is fastened to a rear wall surface of the equipment enclosure 101 by a number of bolts 10. An O-ring 102 is disposed between the gland 8 and the equipment enclosure 101. The stationary ring adaptor 5 is fastened to a rear end surface of the gland 8 by a number of bolts 11. An O-ring 19 is disposed between a front end surface of the stationary ring adaptor 5 and the rear end surface of the gland 8.

The rotating ring adaptor assembly 1 is mounted around the rotating shaft 100, and a locking ring 13 is provided to surround a rear end portion of the rotating ring adaptor assembly 1 so as to fix the rotating ring adaptor assembly 1 to the rotating shaft 100. More particularly, one or more fastening screws 17 are screwed radially into the locking ring 13 and extend through the rear end portion of the rotating ring adaptor assembly 1 to fasten the rotating ring adaptor assembly 1 to the rotating shaft 100.

The locking ring 13 is positioned relative to the spring adaptor 80 in the axial direction by a number of positioning blocks 14. Bolts 15 extend through the positioning blocks 14 in the axial direction respectively and into a rear end surface of the spring adaptor 80. Each positioning block 14 has a radial protrusion 16 inserted into an annular guiding groove of the locking ring 13 such that the locking ring 13, on the one hand, is restricted from moving axially relative to the spring adaptor 80 and, on the other hand, is allowed to rotate relative to the spring adaptor 80.

Figure 16:
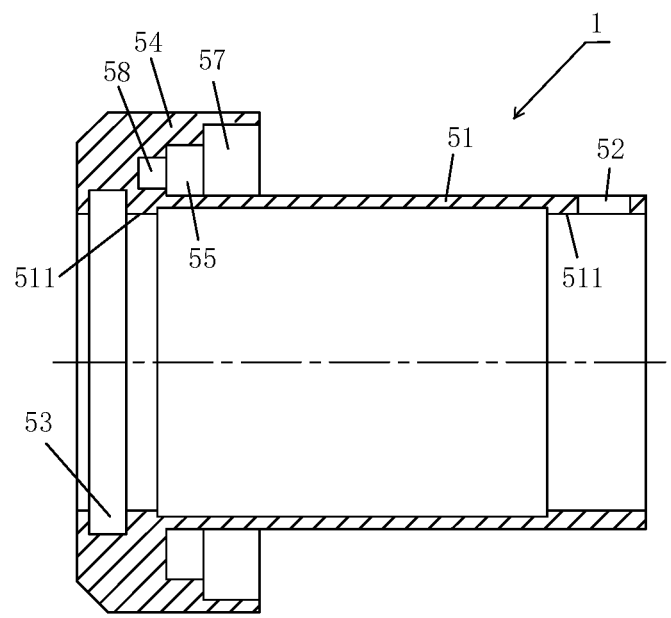
FIG. 16 is a cross-sectional view of a rotating ring adaptor assembly of the sealing device of FIG. 15.

Referring to FIG. 16, the rotating ring adaptor assembly 1 is an integral part in a substantially cylindrical shape, comprising a shaft sleeve 51 with an inner diameter greater than the outer diameter of the rotating shaft 100 so as to be mounted around the rotating shaft 100. The shaft sleeve 51 has an inner peripheral wall formed with at least two convex ring portions 511 protruding radially inwards and axially spaced apart from each other. For example, the two convex ring portions 511 can be located at two axial ends of the shaft sleeve 51 respectively. Each convex ring portion 511 has an inner diameter approximately equal to the outer diameter of the rotating shaft 100 such that the rotating ring adaptor assembly 1 is configured to contact with the rotating shaft 100 via the convex ring portions 511 so as to reduce a resistance for the rotating ring adaptor assembly 1 to slide along the rotating shaft 100.

The shaft sleeve 51 has a rear end portion formed with a number of radial openings 52 through which fastening screws 17 can be screwed respectively and a front end portion with an inner periphery formed with an annular groove for placing an O-ring 48.

The rotating ring adaptor assembly 1 further comprises a flanging 54 bent backwards from the front end portion of the shaft sleeve 51 and surrounding the front end portion of the shaft sleeve 51 such that an annular groove 55 is defined between an inner peripheral wall of the flanging 54 and an outer peripheral wall of the front end portion of the shaft sleeve 51. An annular groove 57 with an enlarged outer diameter is formed axially behind the annular groove 55 for placing an O-ring 47. In addition, a plurality of pin slots 58 into which front parts of the pins 3 can be inserted respectively extend axially forwards in front of the annular groove 55.

Figure 17:
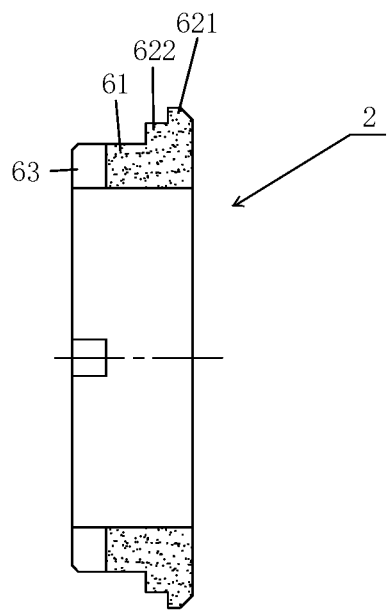
FIG. 17 is a cross-sectional view of a rotating ring of the sealing device of FIG. 15.

Referring to FIG. 17, the rotating ring 2 has an annular shape defining an axial through-hole with an inner diameter slightly greater than the outer diameter of the shaft sleeve 51. The rotating ring 2 comprises a cylindrical body 61 and a flange 621 extending radially outwards from a rear end portion of the cylindrical body 61. The flange 621 has an outer diameter substantially equal to the outer diameter of the flanging 54 of the rotating ring adaptor assembly 1. A number of pins slots 63 are formed in a front end portion of the cylindrical body 61 so as to accommodate rear parts of the pins 3 respectively and can extend radially through the front end portion of the cylindrical body 61.

A transition stepped portion 622 can be formed between the flange 621 and the cylindrical body 61.

When mounting the rotating ring 2 to the rotating ring adaptor assembly 1, the O-ring 47 is mounted around the cylindrical body 61, and then the rotating ring 2 slides forwards from the rear end portion of the shaft sleeve 51, until the cylindrical body 61 is inserted forwards into the annular groove 55 of the rotating ring adaptor assembly 1. The flange 621 is faced to but kept a short distance from a rear end surface of the flanging 54. The O-ring 47 is held in the annular groove 57 by the transition stepped portion 622.

Figures 18, 19:
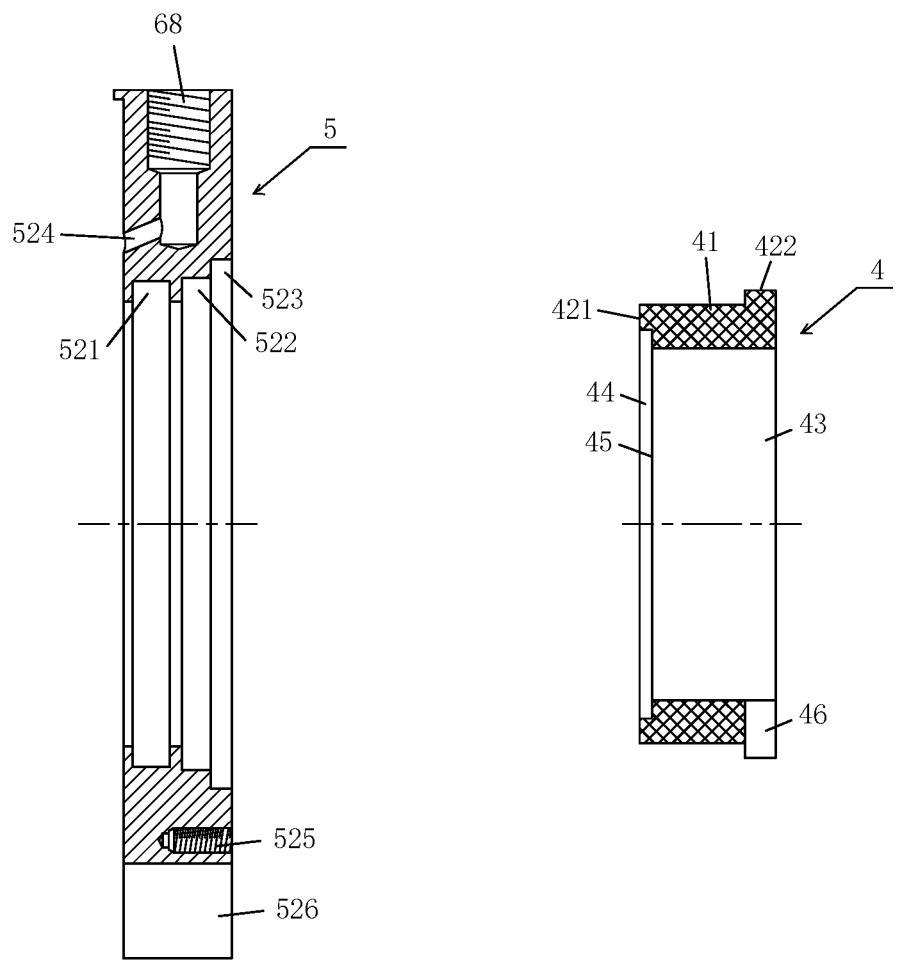
FIG. 18 is a cross-sectional view of a stationary ring adaptor of the sealing device of FIG. 15.
FIG. 19 is a cross-sectional view of a stationary ring of the sealing device of FIG. 15.

Referring to FIG. 18, the stationary ring adaptor 5 has a substantially toroidal shape defining a central axial through-hole with an annular groove 521 for accommodating the O-ring 18, an annular groove 522 axially behind the annular groove 521 and an annular groove 523 axially behind the annular groove 522. The annular groove 523 has a diameter greater than that of the annular groove 522 and is opened to the rear end surface of the stationary ring adaptor 5.

In addition, a rinsing bore 68 extend radially inwards from an outer peripheral surface of the stationary ring adaptor 5. The rinsing bore 68 has a radially inner end configured not to be communicated to the central axial through-hole of the stationary ring adaptor 5, but configured to be communicated to the front end surface of the stationary ring adaptor 5 through a substantially axial orifice 524. In addition, the rinsing bore 68 has a radially outer section configured to be a threaded aperture into which a screw plug can be screwed to close the rinsing bore 68. In addition, the rear end surface of the stationary ring adaptor 5 is formed with threaded apertures 525 into which the bolts 81 can be screwed respectively. In addition, the stationary ring adaptor 5 is formed with axial through-ports (not shown) through which the bolts 11 can be inserted. In addition, the stationary ring adaptor 5 is provided with notches 526 to make room for the bolts 10.

Referring to FIG. 19, the stationary ring 4 has an annular shape comprising a cylindrical body 41 and a convex ring portion 422 protruding radially outwards from a rear end portion of the cylindrical body 41, the convex ring portion 422 having a diameter greater than that of the annular groove 522. The stationary ring 4 is formed with an axial hole 43 and a groove 44 in front of the axial hole 43, the groove 44 having a diameter greater than that of the axial hole 43. Due to the groove 44, the cylindrical body 41 has a front end portion formed with a convex ring portion 421 protruding axially with a thinner peripheral wall. The axial hole 43 has an inner diameter slightly greater than the outer diameter of the shaft sleeve 51.

A number of pin slots 46 are formed from a rear end surface of the cylindrical body 41 so as to accommodate front parts of the pins 7 respectively. The pin slots 46 can extend radially through the cylindrical body 41.

When mounting the stationary ring 4 to the stationary ring adaptor 5, the O-ring 18 is placed in the annular groove 521, and then the cylindrical body 41 is inserted forwards into the central axial through-hole of the stationary ring adaptor 5, until the convex ring portion 422 is partially located in the annular groove 522 and a front end surface of the convex ring portion 421 is rested against a rear end surface of the rotating ring 2.

Referring to FIG. 20, the gland 8 is an integral part in a substantially toroidal shape defining an axial hole 701 and an annular groove 702 with an enlarged diameter and positioned behind the axial hole 701. The gland 8 has a front end portion formed with a convex ring portion 711 protruding axially around the axial hole 701. The convex ring portion 711 is configured to be inserted into the equipment enclosure 101. In addition, the gland 8 has a front end surface formed with an annular groove 712 for accommodating the O-ring 102 and a rear end surface formed with an annular groove 70 for accommodating the O-ring 19. In addition, the gland 8 has a radially outer section formed with a number of axial through-ports 71 through which the bolts 10 can be inserted.

The axial hole 701 has a diameter greater than the outer diameters of the flanging 54 of the rotating ring adaptor assembly 1 and the flange 621 of the rotating ring 2. In an assembled state as illustrated in FIG. 15, a rear part of the flanging 54 of the rotating ring adaptor assembly 1 and the flange 621 of the rotating ring 2 are substantially located within the axial hole 701. As such, the liquid within the equipment enclosure 101 can enter into the annular groove 702 through a gap formed between an inner periphery of the gland 8 and outer peripheries of the rotating ring adaptor assembly 1 and the rotating ring 2. The annular groove 702 is communicated with the orifice 524 of the stationary ring adaptor 5.

Referring to FIG. 21, the spring adaptor 80 is an integral part in a substantially toroidal shape comprising a cylindrical body defining an axial hole 87 with a diameter slightly greater than the outer diameter of the shaft sleeve 51.

An enlarged section 92 with an enlarged diameter is formed in front of the axial hole 87. Due to the enlarged section 92, a convex ring portion 93 protruding axially forwards and a stepped surface 94 facing the front side and interfacing with the axial hole 87 are formed from a front end surface of the cylindrical body. The convex ring portion 93 is configured to be inserted into the annular groove 523 of the stationary ring adaptor 5 until a front end surface of the cylindrical body is mounted against the rear end surface of the stationary ring adaptor 5. A number of spring slots 95 extend axially backwards from the stepped surface 94 so as to accommodate rear parts of the springs 6 respectively, and front parts of the springs 6 press against the rear end surface of the stationary ring 4.

The cylindrical body of the spring adaptor 80 is formed with a plurality of axial through-ports 90 through which the bolts 81 can be inserted. The rear end surface of the spring adaptor 80 is formed with a number of threaded holes (not shown) into which the bolts 15 can be screwed and a plurality of arc-shaped slots 97 into which axial protrusions of the positioning blocks 14 can be inserted so as to position the positioning blocks 14 relative to the spring adaptor 80.

When mounting the sealing device, the stationary ring module is fixed to the equipment enclosure 101 via the gland 8, and the rotating ring module is fixed to the rotating shaft 100 via the rotating ring adaptor assembly 1 and the locking ring 13. A front end surface of the stationary ring 4 is pressed forwards against the rear end surface of the rotating ring 2 with an axial force exerted by the springs 6.

The rotating and stationary rings 2, 4, the stationary ring adaptor 5, and the spring adaptor 80 are mounted around the shaft sleeve 51 of the rotating ring adaptor assembly 1 in order. As such, the shaft sleeve 51 extends sufficiently in a lengthwise direction to carry the rotating and stationary rings 2, 4, the stationary ring adaptor 5, and the spring adaptor 80 and expose the rear end portion of the shaft sleeve 51 from the stationary ring adaptor 5 and insert the rear end portion of the shaft sleeve 51 into the locking ring 13. The rotating ring adaptor assembly 1 is fastened to the rotating shaft 100 by means of the fastening screws 17. The locking ring 13 and the spring adaptor 80 are locked in the axial direction by means of the positioning blocks 14 and the bolts 15. The locking ring 13 can rotate relative to the positioning blocks 14 but cannot move axially.

Figure 22:
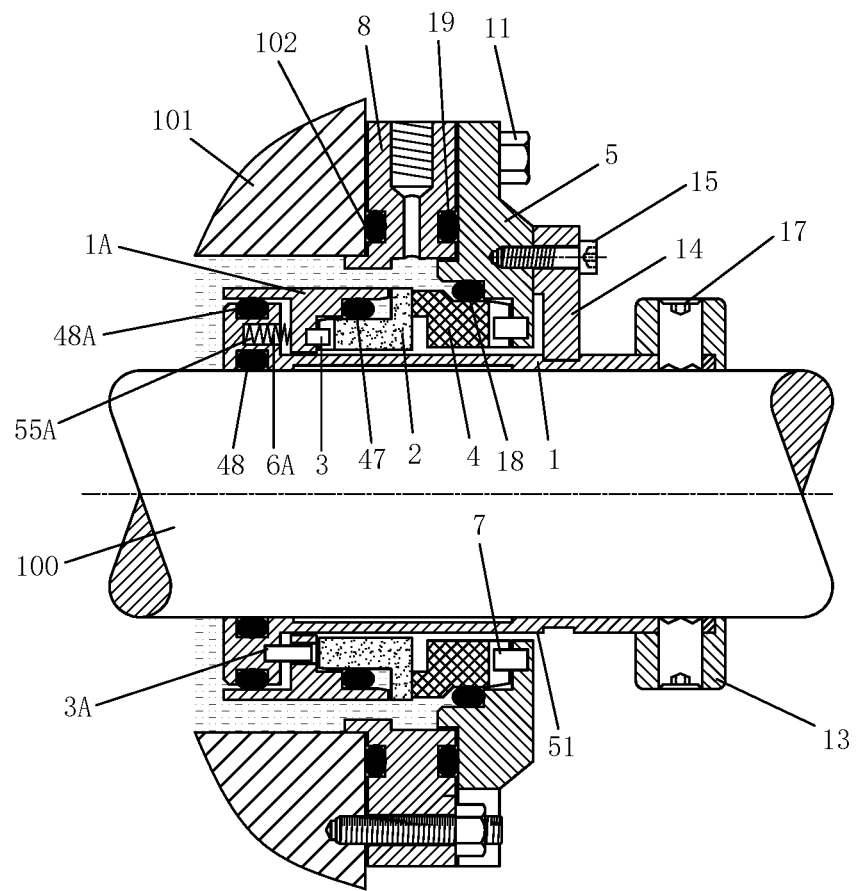
FIG. 22 is a cross-sectional view of a cartridge type mechanical sealing device for sealing liquid according to yet another embodiment of the present application.

FIG. 22 shows another exemplary embodiment of a cartridge type mechanical sealing device for sealing liquid. The embodiment as illustrated in FIG. 22 does not adopt a spring adaptor and specifies a rotating ring adaptor assembly in which springs are disposed and different from the embodiment as illustrated in FIGS. 1-10.

Specifically, as shown in FIG. 22, the rotating ring adaptor assembly 1 comprises a shaft sleeve 51 and a rotating ring adaptor 1A mounted around the shaft sleeve 51 and axially displaceable relative to the shaft sleeve 51. In other words, the rotating ring adaptor 1A is a separate component comprising a front end portion, a body portion, and a rear end portion. The shaft sleeve 51 has a front end portion formed with a convex section protruding radially outwards relative to the rest of the shaft sleeve 51 such that the front end portion of the shaft sleeve 51 has an inner periphery formed with a first annular groove for accommodating an O-ring 48, and the convex section has an outer periphery formed with a second annular groove for placing another O-ring 48A, wherein the front end portion of the rotating ring adaptor 1A is seated on the convex section via the another O-ring 48A.

On the one hand, the front end portion of the shaft sleeve 51 is formed with a plurality of spring slots 55A extending axially forwards from a rear end surface of the convex section so as to accommodate front parts of the springs 6A respectively and a plurality of pin slots extending axially forwards from the rear end surface of the convex section so as to accommodate front parts of pins 3A respectively. In the meanwhile, rear parts of the springs 6A press against an end surface of the body portion of the rotating ring adaptor 1A, and rear parts of the pins 3A can be inserted into pin slots provided in the body portion of the rotating ring adaptor 1A respectively so as to ensure the rotating ring adaptor 1A can rotate with the shaft sleeve 51.

On the other hand, the rear end portion of the rotating ring adaptor 1A is configured to support a rotating ring 2 as described above. An end surface of the rotating ring 2 adjoins an end surface of a stationary ring 4 by means of the springs 6A which exert an axial force to the end surface of the body portion of the rotating ring adaptor 1A.

When maintaining the sealing device in the embodiment as illustrated in FIG. 22 (positioning blocks 14 are detached), bolts 11 are unscrewed to release a stationary ring adaptor 5 from a gland 8 such that the stationary ring adaptor 5 supporting the stationary ring 4 or the rotating ring adaptor 1A supporting the rotating ring 2 can slide backwards along a rotating shaft 100 to separate from the gland 8, thereby separating the rotating and stationary rings 2, 4 to release a sealing interface and exposing the rotating and stationary rings 2, 4 to an airside. As such, the rotating and stationary rings 2, 4, and the springs 6A can be checked and replaced if necessary.

In addition, in the embodiments described above with reference to FIGS. 1 to 14 and 22, as the stationary ring 4 comprises the cylindrical body 41 and the convex ring portion 42 in front of the cylindrical body 41, after the stationary ring adaptor is released and moved backwards to expose the stationary ring 4 for maintenance, the stationary ring 4 could be moved forwards relative to the stationary ring adaptor 5 and then removed from the stationary ring adaptor 5 in the radial direction. In the embodiment described with reference to FIGS. 15 to 21, as the stationary ring 4 comprises the cylindrical body 41 and the convex ring portion 422 behind the cylindrical body 41, after the bolts 81 are unscrewed to separate the spring adaptor 80 from the stationary ring adaptor 5, the stationary ring 4 can be moved backwards relative to the stationary ring adaptor 5 and then removed from the stationary ring adaptor 5 in the radial direction, thereby maintaining the stationary ring 4 conveniently.

In addition, in the embodiment described above with reference to FIGS. 1 to 10, the main body of the stationary ring adaptor 5 is inserted into the gland 8; in the embodiment described above with reference to FIGS. 11 to 14, the main body of the stationary ring adaptor 5 is inserted into the gland 8, and the cylindrical body of the spring adaptor 80 is inserted into the stationary ring adaptor 5; in the embodiment described above with reference to FIGS. 15 to 21, the main body of the stationary ring adaptor 5 is attached to the rear end surface of the gland 8, and the cylindrical body of the spring adaptor 80 is attached to the rear end surface of the stationary ring adaptor 5; and in the embodiment described with reference to FIG. 22, the stationary ring adaptor 5 has a main body attached to a rear end surface of the gland 8. It should be understood that in the embodiment as illustrated in FIGS. 1 to 10, the main body of the stationary ring adaptor 5 can be alternatively attached to the rear end surface of the gland 8; in the embodiment as illustrated in FIGS. 11 to 14, the main body of the stationary ring adaptor 5 can be alternatively attached to the rear end surface of the gland 8, and/or the cylindrical body of the spring adaptor 80 can be alternatively attached to the rear end surface of the stationary ring adaptor 5; and in the embodiments as illustrated in FIGS. 15 to 22, the main body of the stationary ring adaptor 5 can be alternatively inserted into the gland 8, and/or the cylindrical body of the spring adaptor 80 can be alternatively inserted into the stationary ring adaptor 5.

It should be noted that the structures and features in the different embodiments described in this application can be used interchangeably. For example, a rotating ring module in an embodiment can be used in combination with a stationary ring module (including a spring adaptor) in another embodiment.

Although some specific embodiments of the present application have been demonstrated in detail with examples, it should be understood by a person skilled in the art that the above examples are only intended to be illustrative but not to limit the scope of the present application. It should be understood by those skilled in the art that the above embodiments could be modified without departing from the scope and spirit of the present application. The scope of the present application is defined by the appended claims.

What is claimed is:

1. A cartridge type mechanical sealing device for sealing liquid, the sealing device being configured to seal a rotating shaft extending through an equipment enclosure so as to seal the liquid inside the equipment enclosure from outside air, and comprising:

a gland (8), a rotating ring adaptor assembly (1), a rotating ring (2), a stationary ring adaptor (5), a stationary ring (4), and a locking ring (13) for mounted around the rotating shaft;

the gland (8) is configured to be fastened to a rear end surface of the equipment enclosure;

the rotating ring adaptor assembly (1) comprises a front end portion configured to be in the liquid and supporting the rotating ring (2) via a first elastic sealing O-ring (47), and a rear end portion extending through the gland (8) such that the rotating ring adaptor assembly (1) is integral with the gland (8), wherein the gland (8) is configured to be away from the liquid and surrounded by the locking ring (13) which is configured to fasten the rotating ring adaptor assembly (1) to the rotating shaft;

the stationary ring adaptor (5) is fastened to a rear end surface of the gland (8) such that the stationary ring adaptor (5) is configured to be integral with the gland (8) and comprises an inner peripheral surface configured to be adjacent to the liquid and supporting the stationary ring (4) via a second elastic sealing O-ring (18);

an end surface of the rotating ring (2) adjoins an end surface of the stationary ring (4) by means of springs (6) so as to form a sealing interface configured to be perpendicular to an axis of the rotating shaft, wherein a convex ring portion (42) of the stationary ring (4) is pressed forward against the rear end surface of the rotating ring (2) with an axial force exerted by the springs (6); and when the stationary ring adaptor (5) is configured to be releasable from the gland (8), a rotating ring adaptor (1A) of the rotating ring adaptor assembly (1) or the stationary ring adaptor (5) configured to be pulled along the rotating ring in a direction away from the liquid so as to be separated from the gland (8), thereby separating the rotating ring (2) and the stationary ring (4) to release the sealing interface and exposing the rotating ring (2) and the stationary ring (4) to the outside air respectively, wherein the rear end portion of the rotating ring adaptor assembly (1) is fastened to the rotating shaft and the rear end portion of the stationary ring adaptor (5) is fastened to the gland (8) such that the rotating ring adaptor assembly (1), the stationary ring adaptor (5), and the gland (8) form an integral part of the sealing device.

2. The sealing device according to claim 1, wherein one or both of the rotating ring (2) and the stationary ring (4) are configured to be of split type which can be split along a split line that is perpendicular to the axis of the rotating shaft.

3. The sealing device according to claim 1, wherein one or both of the first elastic sealing O-ring (47) and the second elastic sealing O-rings (18) are configured to be of split type.

4. The sealing device according to claim 1, further comprising a spring adaptor (80) mounted around the rear end portion of the rotating ring adaptor assembly (1), fastened to the stationary ring adaptor (5), and comprising a front end portion provided with spring slots for receiving the springs (6) respectively, wherein when the spring adaptor (80) is released from the stationary ring adaptor (5), the spring adaptor (80) can be pulled away from the rotating ring in the direction away from the liquid so as to be separated from the stationary ring adaptor (5), thereby exposing the springs (6) to the outside air.

5. The sealing device according to claim 1, wherein the rotating ring adaptor assembly (1) comprises a shaft sleeve (51) configured to surround the rotating shaft and comprising a front end portion provided with spring slots (55A) for receiving the springs, and wherein the rotating ring adaptor (1A) is mounted around the shaft sleeve (51) and comprises a front end portion pushed by the springs and a rear end portion supporting the rotating ring (2).

6. The sealing device according to claim 1, wherein the gland (8) is provided with a rinsing bore (68) extending radially therethrough, the stationary ring adaptor (5) comprises an outer periphery formed with an annular groove (34) configured to be in communication with a radially inner end of the rinsing bore (68) and a radially inner end in communication with a front end surface of the stationary ring adaptor (5) via a plurality of axial orifices (35) a radially inner end in communication with a front end surface of the stationary ring adaptor (5) via an orifice (524).

7. The sealing device according to claim 1, wherein the stationary ring (4) is configured to be moved one of forwards and backwards relative to the stationary ring adaptor (5) so as to be separated from the stationary ring adaptor (5).

8. The sealing device according to claim 1, further comprising detachable positioning blocks (14), wherein the locking ring (13) is configured to be rotatably positioned relative to the positioning blocks (14) so as to package: the gland (8), the rotating ring adaptor assembly (1), the rotating ring (2) supported by the rotating ring adaptor assembly (1) via the first elastic sealing O-ring, the stationary ring adaptor (5), the stationary ring (4) supported by the stationary ring adaptor (5) via the second elastic sealing O-ring, and the springs (6) together, thereby forming the cartridge mechanical seal.

9. The sealing device according to claim 1, wherein the springs (6) are configured as cylindrical coil springs.

10. The sealing device according to claim 4, wherein the stationary ring adaptor (5) is fastened to the rear end surface of the gland (8) by one of inserting a main body of the stationary ring adaptor (5) into the gland (8) and attaching the main body of the stationary ring adaptor (5) to the rear end surface of the gland (8), and wherein the spring adaptor (80) is fastened to a rear end surface of stationary ring adaptor (5) by one of inserting a main body of the spring adaptor (80) into the stationary ring adaptor (5) and attaching the main body of the spring adaptor (80) to the rear end surface of the stationary ring adaptor (5).

11. A cartridge type mechanical sealing device for sealing liquid, said sealing device being configured to seal a rotating shaft extending through an equipment enclosure so as to seal a liquid within said equipment enclosure from outside air, said sealing device comprising:

a rotating ring adaptor assembly;

a rotating ring;

a stationary ring adaptor;

a stationary ring;

a locking ring, wherein each of said rotating ring adaptor assembly, said rotating ring, said stationary ring adaptor, said stationary ring, and said locking ring are for mounting around said rotating shaft;

a gland configured to be releasably fastened to a rear end surface of the equipment enclosure;

wherein said rotating ring adaptor assembly includes a front end portion supporting the rotating ring via a first elastic sealing O-ring and a rear end portion extending through said gland such that said rotating ring adaptor assembly is integral with said gland and said gland is surrounded by the locking ring, thereby configured to fasten said rotating ring adaptor assembly to said rotating shaft;

said stationary ring adaptor being fastened to a rear end surface of said gland such that said stationary ring adaptor is configured to be integral with said gland and comprising an inner peripheral surface configured to be adjacent to said liquid and supporting said stationary ring via a second elastic sealing O-ring;

wherein said rotating ring is biased to contact said stationary ring so as to form a sealing interface perpendicular to an axis of said rotating shaft; and wherein when said stationary ring adaptor is released from said gland, one of a rotating ring adaptor of said rotating ring adaptor assembly and said stationary ring adaptor can be pulled along said rotating ring in a direction away from said liquid so as to be separated from said gland, thereby separating said rotating ring and said stationary ring to release said sealing interface and exposing said rotating ring and said stationary ring to said outside air, wherein said rear end portion of said rotating ring adaptor assembly is fastened to said rotating shaft and said rear end portion of said stationary ring adaptor is fastened to said gland such that said rotating ring adaptor assembly, said stationary ring adaptor, and said gland form an integral part of said sealing device.

12. The cartridge type mechanical sealing device according to claim 11, wherein: one or both of said rotating ring and said stationary ring are configured to be of split type which are split along a split line that is perpendicular to said axis of said rotating shaft.

13. A cartridge type mechanical sealing device for sealing liquid, said sealing device being configured to seal a rotating shaft extending through an equipment enclosure so as to seal a liquid within said equipment enclosure from outside air, said sealing device comprising:
   a rotating ring configured to be located on an interior side of said equipment enclosure;
   a stationary ring configured to be located on an opposing exterior side of said equipment enclosure, said rotating ring and said stationary ring configured to be oriented about said rotating shaft and being biased into one another by an active biasing element;
   a gland configured to be releasably fastened to said exterior side of said equipment enclosure, a stationary ring adaptor for supporting said stationary ring, said stationary ring adaptor being releasably fastened to said gland; and
   wherein when said stationary ring is released from said gland, said stationary ring adaptor can be pulled in a direction away from said liquid so as to be separated from said gland, exposing said rotating ring and said stationary ring to said outside air,
   wherein a rear end portion of said rotating ring is fastened to said rotating shaft and a rear end portion of said stationary ring is fastened to said gland such that said rotating ring, said stationary ring, and said gland form an integral part of said sealing device.

14. The cartridge type mechanical sealing device according to claim 13, wherein:
   one or both of said rotating ring and said stationary ring are configured to be of split type which are split along a split line that is perpendicular to an axis of said rotating shaft.

15. A method for sealing utilizing a cartridge type mechanical sealing device, said sealing device being configured to seal a rotating shaft extending through an equipment enclosure so as to seal a liquid within said equipment enclosure from outside air, said method comprising the steps of:
   positioning a rotating ring being on an interior side of said equipment enclosure;
   positioning a stationary ring on an opposing exterior side of said equipment enclosure, said rotating ring and said stationary ring being oriented about said rotating shaft and being biased into one another by an active biasing element;
   releasably fastening a gland to said exterior side of said equipment enclosure; and
   providing a stationary ring adaptor for supporting said stationary ring, said stationary ring adaptor being releasably fastened to said gland;
   wherein releasing said stationary ring from said gland permits said stationary ring adaptor to be pulled in a direction away from said liquid so as to be separated from said gland, exposing said rotating ring and said stationary ring to said outside air,
   fastening a rear end portion of said rotating ring to said rotating shaft and fastening a rear end portion of said stationary ring adaptor to said gland such that said rotating ring, said stationary ring adaptor, and said gland form an integral part of said sealing device.

16. The method for sealing utilizing a cartridge type mechanical sealing device according to claim 15, further comprising the steps of:
   forming one or both of said rotating ring and said stationary ring to be of a split type which are split along a split line that is perpendicular to an axis of said rotating shaft.

* * * * *